United States Patent [19]

Kawakami et al.

[11] Patent Number: 4,602,346
[45] Date of Patent: Jul. 22, 1986

[54] METHOD AND APPARATUS FOR PROCESSING IMAGE DATA USING SUM AND SUBTRACT OPERATIONS

[75] Inventors: Katsura Kawakami, Yokohama; Shigeo Shimazaki, Kawasaki; Etsuko Hirokami, Tokyo, all of Japan

[73] Assignee: Matsushita Electric Industrial Co., Ltd., Japan

[21] Appl. No.: 612,010

[22] Filed: May 18, 1984

[30] Foreign Application Priority Data

| | | | |
|---|---|---|---|
| May 19, 1983 | [JP] | Japan | 58-88527 |
| May 19, 1983 | [JP] | Japan | 58-88531 |
| Jun. 2, 1983 | [JP] | Japan | 58-98348 |
| Jun. 10, 1983 | [JP] | Japan | 58-104444 |
| Mar. 9, 1984 | [JP] | Japan | 59-45832 |

[51] Int. Cl.$^4$ .................................. G06F 15/20
[52] U.S. Cl. .......................... 364/518; 382/47
[58] Field of Search ............ 364/518, 525, 577; 382/47, 56, 50, 44, 46

[56] References Cited

U.S. PATENT DOCUMENTS

| | | | |
|---|---|---|---|
| 3,976,982 | 8/1976 | Eiselen | 382/47 X |
| 4,052,699 | 10/1977 | Micka et al. | 382/46 |
| 4,168,488 | 9/1979 | Evans | 364/521 X |
| 4,267,573 | 5/1981 | Chaikin et al. | 382/47 X |
| 4,381,547 | 4/1983 | Ejiri | 382/47 |
| 4,484,347 | 11/1984 | Kashioka | 382/46 X |
| 4,551,768 | 11/1985 | Tsuchiya et al. | 382/56 X |

FOREIGN PATENT DOCUMENTS 0009378 4/1980 European Pat. Off. .
0093429 11/1983 European Pat. Off. .

Primary Examiner—Edward J. Wise
Attorney, Agent, or Firm—Lowe, Price, LeBlanc, Becker & Shur

[57] ABSTRACT

Image data is transposed between successively arranged first data points in a first image field and successively arranged second data points in a second image field by a method comprising: (1) successively specifying a first data point (i); (2) summing first control data indicative of a residue with second control data indicative of a constant value; ($3_1$) if the result of the summation does not exceed a predetermined value, updating the first control data with the summation result and specifying a second data point (j) corresponding to the specified first data point, or ($3_2$) if the result exceeds the predetermined value, subtracting it from the summation result to update the first control data with the residue, and specifying a second data point (j) which is shifted by one data point with respect to the specified first data point; (4) transferring the image data from the specified first data point to the specified second data point or from the specified second data point to the specified first data point depending on the relative size of the first and second image fields. The steps (1) to (4) are repeated until all the second data points are filled with the image data.

18 Claims, 18 Drawing Figures

FIG. 2

| POINTER $i$ | $R = \dfrac{m}{n}$ | RESIDUE $R$ | CARRY | POINTER $j$ |
|---|---|---|---|---|
| 1 | $\dfrac{5}{16} + 0 = \dfrac{5}{16}$ | $r_1 = \dfrac{5}{16}$ | 0 | 1 |
| 2 | $\dfrac{5}{16} + \dfrac{5}{8} = \dfrac{15}{16}$ | $r_2 = \dfrac{15}{16}$ | 0 | 1 |
| 3 | $\dfrac{15}{16} + \dfrac{5}{8} = \dfrac{25}{16}$ | $r_3 = \dfrac{9}{16}$ | 1 | 2 |
| 4 | $\dfrac{9}{16} + \dfrac{5}{8} = \dfrac{19}{16}$ | $r_4 = \dfrac{3}{16}$ | 1 | 3 |
| 5 | $\dfrac{3}{16} + \dfrac{5}{8} = \dfrac{13}{16}$ | $r_5 = \dfrac{13}{16}$ | 0 | 3 |
| 6 | $\dfrac{13}{16} + \dfrac{5}{8} = \dfrac{23}{16}$ | $r_6 = \dfrac{7}{16}$ | 1 | 4 |
| 7 | $\dfrac{7}{16} + \dfrac{5}{8} = \dfrac{17}{16}$ | $r_7 = \dfrac{1}{16}$ | 1 | 5 |
| 8 | $\dfrac{1}{16} + \dfrac{5}{8} = \dfrac{11}{16}$ | $r_8 = \dfrac{11}{16}$ | 0 | 5 |

$$R_0 = \dfrac{5}{16}$$

FIG. 7
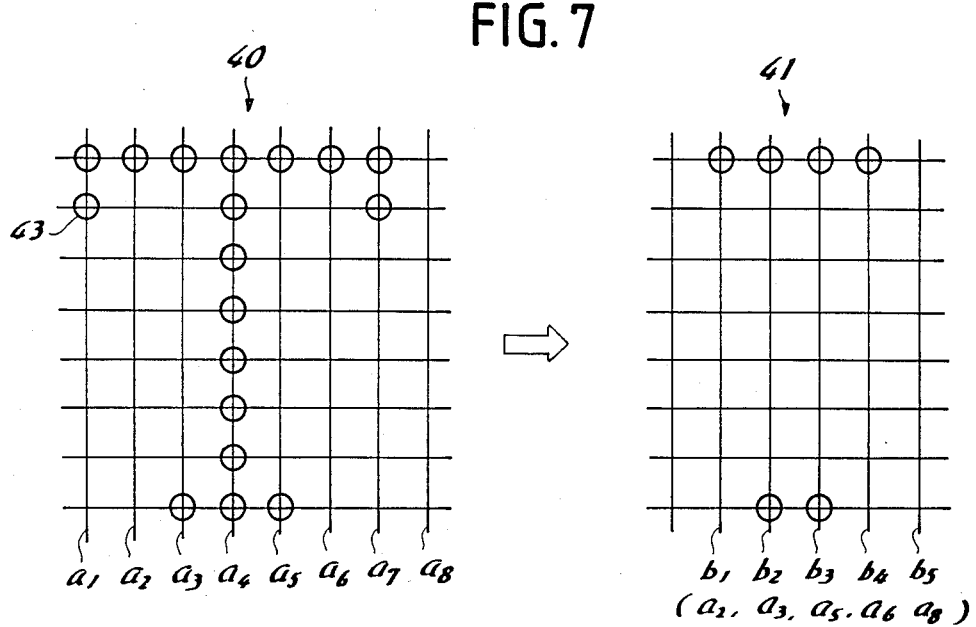
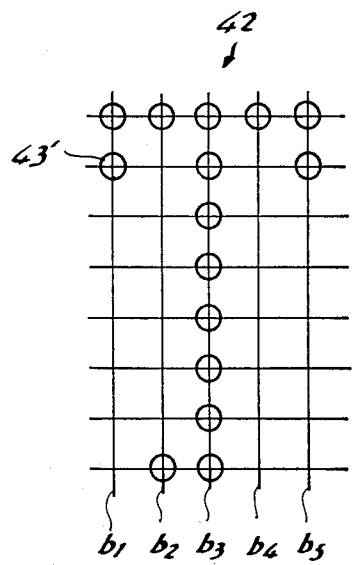

METHOD AND APPARATUS FOR PROCESSING IMAGE DATA USING SUM AND SUBTRACT OPERATIONS

BACKGROUND OF THE INVENTION

The present invention relates generally to data processing systems, and in particular to a logical image controller in which logical operations are performed upon two-valued image signals to provide scaling of an original image to a desired size and rotation of the image to a desired angular position With the extensive use of microcomputers in various fields of businesses, demands have been arisen to scale up or down or rotate a video image on the screen of a data processor at high speeds. To derive the location of pixels of the image on a destination field the usual practice is to employ a method known as the Affine conversion matrix in which a desired scaling ratio is multiplied upon a line segment on which pixels of the source image field are located. However, this requires multiplication operations to be performed upon each pixel of the original image field. Since multiplication operation involves a large number of computation steps, it takes longer to process all the binary image signals of an image field

SUMMARY OF THE INVENTION

It is therefore an object of the present invention to reduce the amount of time involved in processing image data for conversion of image size and orientation.

This object is obtained by the use of sum and subtract operations instead of multiplication operation.

The present invention provides a method for processing image data by transposition between successively arranged first data points in a first image field and successively arranged second data points in a second image field. The method comprises the steps of:

(a) successively specifying a first data point;

(b) summing first control data representing a residual value with second control data representing a constant value;

(c) ($c_1$) if the result of the summation does not exceed a predetermined value, updating the first control data with the result of the summation and specifying a second data point corresponding to the specified first data point, and ($c_2$) if the result exceeds the predetermined value, subtracting same from the summation result to update the first control data with the residual value of the subtraction, and specifying a second data point which is shifted by one data point with respect to the specified first data point;

(d) transferring the image data from the specified first data point to the specified second data point when the first image field is greater in dimension than the second image field, or transferring the image data from the specified second data point to the specified first data point when the first image field is smaller in dimension than the second image field; and (e) repeating the steps (a) to (d) until all the data points to which the image data are to be transferred are filled with image data bits.

The present invention further provides an apparatus for processing image data by transposition between successively arranged first data points in a first image field and successively arranged second data points in a second image field. The apparatus comprises:

first means for generating a clock pulse;

second means responsive to the clock pulse for summing first control data of a residual value with second control data of a constant value and if the sum exceeds a predetermined value subtracting the predetermined value from the sum and renewing the first control data with the residual value of the subtraction;

third means having storage locations defining the first data points for storing therein the image data and shifting the stored image data therealong in response to the clock pulse in a first direction when the first image field is greater in dimension that the second image field and in a second direction when the first image field is smaller in dimension that the second image field; and fourth means having storage positions defining the second data points connected to the third means for storing and shifting the image data therealong in response to the sum exceeding the predetermined value in the first direction from the third means to the fourth means when the first image field is greater in dimension than the second image field and in the second direction from the fourth means to the third means when the first image field is smaller in dimension than the second image field

BRIEF DESCRIPTION OF THE DRAWINGS

The present invention will be described in further detail with reference to the accompanying drawings, in which:

FIGS. 1a, 1b and 2 are illustrations useful for describing the underlying principle of the present invention;

FIG. 7 is an illustration useful for describing a feature of the present invention;

DETAILED DESCRIPTION

Figure 1A:
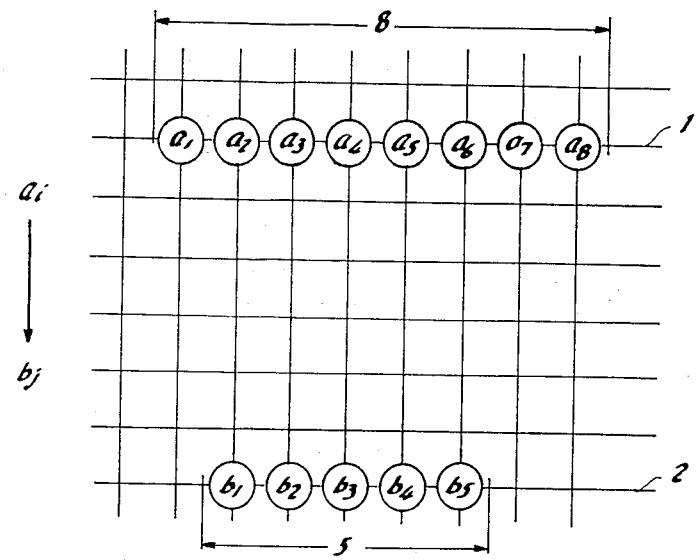
Figure 1B:
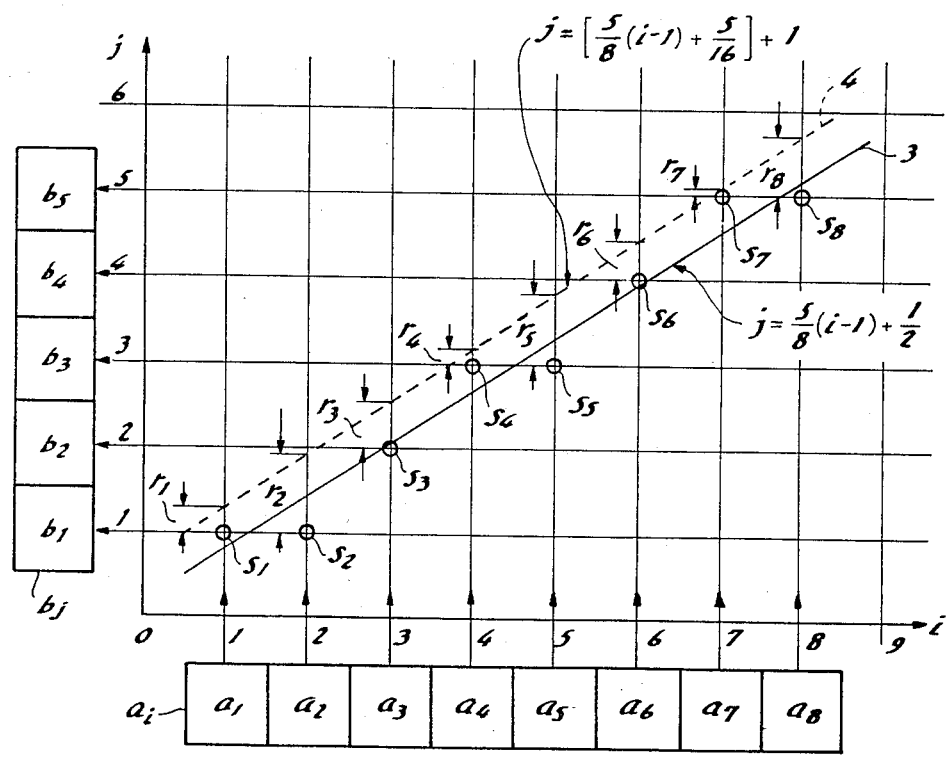

Before going into the detail of the present invention it is appropriate to discuss the principle underlying the present invention with reference to FIGS. 1a and 1b. Consider first that a selected region of an image displayed on the screen of a cathode ray tube is scaled up or down with a desired ratio m/n. Each of the pixels on the screen image is represented by a binary 1 or 0 and located at the intersection of a row and a column of a square matrix to make it compatible with the row-column format of a frame memory to be described. It is assumed that a set of eight original binary image data $a_i$ (i=1 to 8) representing the image densities of pixels on a row 1 is scaled down with a reduction ratio of ⅝ to a set of five binary image data $b_j$ (j=1 to 5) arranged on a row 2, as shown in FIG. 1a. For purposes of simplicity the lattice interval is assumed to be unity for the moment.

The pixel location is represented by the system of coordinates and if the row number is known, each pixel is identified by an integral number representing the column on which it is located. Any fractional number which is derived in the process of computation is stored as a "residue" in a register. In FIG. 1b, the original image data $a_1$ to $a_8$ are arranged on the abscissa of a coordinate system and the scaled-down image data $b_1$ to $b_5$ are on the ordinate. A solid line 3 has a slope ratio of ⅝ which corresponds to the reduction ratio and dots $S_1$ to $S_8$ are located at intersections which are closest to the conversion slope 3 measured in a direction parallel to the ordinate.

Subscript j represents the output pointer of a memory system to be described and is a function of the input pointer i as given by the following relation:

$$j(i) = [(m/n)(i-1) + R_o] \quad (1)$$

where, i = 1, 2, ..., n, j = 1, 2, ..., m, and if $R_o = m/2n$, $$\begin{aligned} j(i) &= [(m/n)(i-1) + m/2n] + 1 \\ &= [(m/n)\{i - (1/2)\}] + 1 \end{aligned} \quad (2)$$

Therefore, Equation 2 is written as:

$$j = [(\tfrac{5}{8})(i-1) + 5/16] + 1 \quad (3)$$

The dotted line 4 in FIG. 1b represents Equation 3 and the solid line 3 is represented by the following equation:

$$j = (\tfrac{5}{8})\{(i - (\tfrac{1}{2}))\} + \tfrac{1}{2} \quad (4)$$

An initial value $m/2n$ (=5/16) is first reset into the register as the "residue" when the pointer i is 1 and the j pointer is set to 1. In response to the i pointer being incremented to 2, the scale down ratio ⅝ is added to the initial value of residue 5/16 to give a total of 15/16 and the j pointer remains unaltered. The same scale down ratio ⅝ is added each time the i pointer is incremented. When the total value exceeds "1", a carry signal of the unity value "1" is overflowed from the register, reducing the total value stored therein to 9/16 when the i pointer is incremented to 3, and the j pointer is incremented to 2. Thus, the j pointer remains unaltered when the register content is smaller than unity and is incremented when the unity value is exceeded As the above process is repeated, the register is overflowed when the i pointer becomes equal to 3, 4, 6 and 7 and the j pointer is incremented in response thereto as illustrated in FIG. 2.

Figure 3:
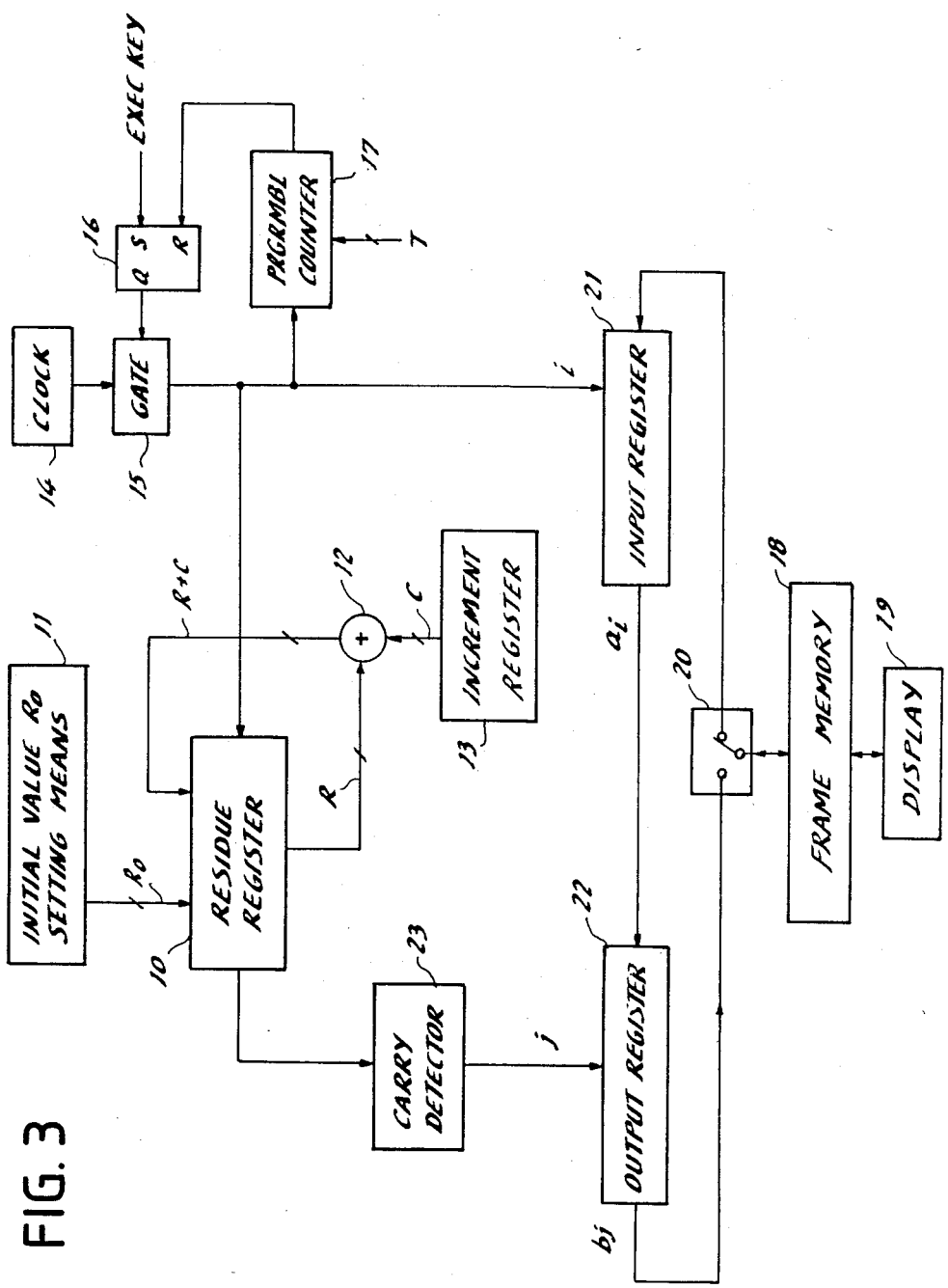
FIG. 3 is an illustration of a hardware embodiment of the present invention.

FIG. 3 is a schematic illustration of the internal structure of a microprocessor according to an embodiment of the present invention. The embodiment comprises a residue register 10, a setting means 11 for setting an initial residue $R_o$ to the register 10, and an adder 12 which forms part of the arithmetic logic unit (ALU) of the microprocessor.

To generalize the concept of the present invention, the lattice interval is represented by a quantity L which is in turn represented by L stages of the residue register 10. An increment register 13 stores a constant C which equals $(m/n)L$, this value being applied to the adder 12 and summed with a value R stored in the register 10, giving a total R+C. This total value is fed back to the register 10.

The residue register 10 is triggered in response to input pulses supplied from a clock source 14 through a gate 15 which is gated on in response to an output signal from a flip-flop 16 whose setting input is activated by an EXECUTE key, not shown, of a keyboard and whose resetting input is connected to the output of a programmable counter 17. This counter 17 is arranged to be cleared in response to the operation of the EXECUTE key and takes its input from the gate 15 to count the clock pulse until a value T is reached which indicates the number of pixels contained in the selected image area and is preset by a command signal from the keyboard, so that gate 15 is open for an interval corresponding to the preset value T.

A frame memory 18 stores binary image signals from a desired area of a display 19 for successively feeding an input register 21 through a switching means 20 with image signals on successive rows in response to the end of reduction operations performed upon each row. The input register 21 includes a plurality of storage locations which defines source data points of a first image field on which original image data bits are located and shifted by one bit position to the left in response to a clock pulse from the gate 15 which is applied as the i pointer. The shifted image data $a_i$ is applied in succession to an output register 22 which includes a plurality of storage locations defining destination data points of a second image field to which input image data $a_i$ is transferred.

In response to each clock pulse, the register 10 is loaded with the sum R+C from the adder 12. When the stored total value exceeds the maximum value L, a carry signal is overflowed from the register 10 and the value L is automatically subtracted from the stored value, leaving a fractional number R which is fed to the adder 12 to be summed with the incremental value C in response to the next triggering clock pulse.

The output register 22 is shifted one bit position to the left in response to the j pointer which is applied from a carry detector 23 whenever an overflow occurs in the residue register 10, generating output binary image signals $b_j$. Switch 20 is switched to apply the output image signals $b_j$ to the frame memory 18 to be displayed within an area in the display 19 which is scaled down with a ratio m/n. Upon transfer of the output data $b_j$ to the frame memory, input image signals on the next row are transferred from the frame memory to the input register 21. The above process is repeated until the preset value T is reached in the counter 17.

Figures 4, 4A:
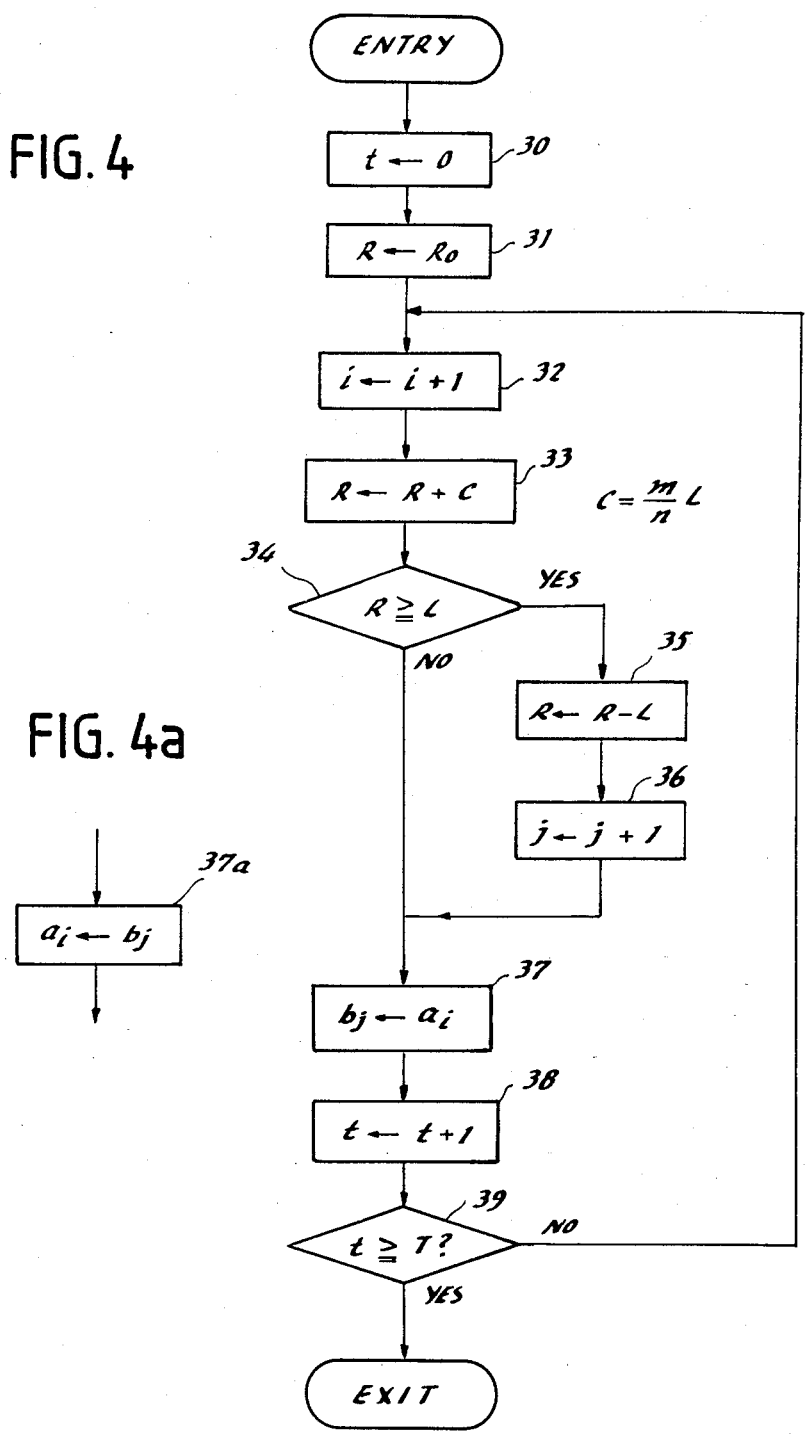
FIG. 4 is an illustration of a software embodiment corresponding to the FIG. 3 embodiment.
FIG. 4a is a modification of FIG. 4 which is employed when the original image field is scaled up.

FIG. 4 is an illustration of a flow diagram associated with the hardware version of the present embodiment. A timer count value t of counter 17 is initialized to zero (block 30) and the residue R is initialized to $R_o$ (block 31). The i pointer is incremented by one (block 32) and the residue R is summed with incremental value C in adder block 33. The summed residue is checked against the value L in check block 34 and if R is equal to or greater than L, control exits to a block 35 to subtract L from R and the j pointer is incremented by one (block 36). If R is smaller than L, blocks 35 and 36 are skipped and block 37 is executed by setting $a_i$ to $b_j$. Count value t is incremented by one (block 38) and control returns to block 32 to repeat the above steps 32 to 38 through block 39 until t becomes equal to or greater than the preset value T.

Original images can be scaled up in a manner inverse to the scale down process described above. Therefore, in the embodiment of FIG. 3 the original image data is stored in the output register 22 and shifted to the input register 21 in response to a j pointer increment and delivered therefrom in response to an i pointer increment which occurs at regular intervals. In the flow diagram of FIG. 4, it is only necessary that the direction of arrow in block 37 be reversed as shown at 37a in FIG. 4a when image expansion is desired.

Figure 5:
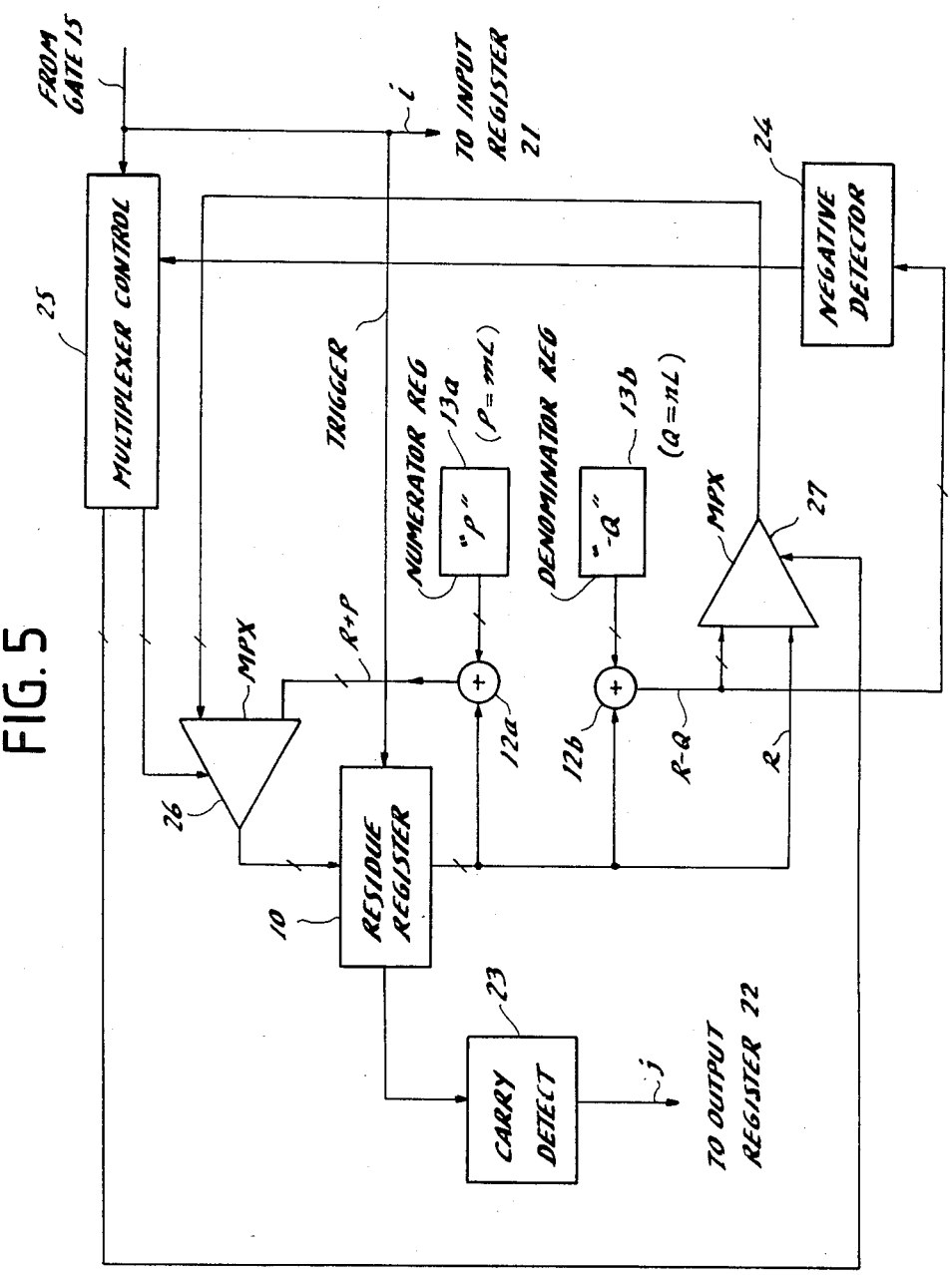
FIG. 5 is an illustration of a modified embodiment of FIG. 3.

FIG. 5 is an illustration of a pratical form of the FIG. 3 embodiment, wherein parts corresponding to those in FIG. 3 are marked with the same numerals used in FIG. 3. The increment register 13 of FIG. 3 is divided into a numerator register 13a storing a value P which is a product of distance L multiplied by m and a denominator register 13b storing a value −Q which is a product of distance L multiplied by n. Likewise, the adder 12 is divided into a first adder 12a which provides summation of R from register 10 with the numerator P and a second adder 12b which provides summation of R with a denominator −Q. The binary output of adder 12b is applied to a negative detector 24 which provides an output when the result of the summation at 12b is of a negative value to a multiplexer controller 25 which controls first and second multiplexers 26 and 27. These multiplexers are controlled such that the first multiplexer 24 initially applies the output (R+P) from adder 12a to register 10 and subsequently the second multiplexer 25 is controlled in dependence on the output of the negative detector 24. If the summation by the adder 12b results in a positive value, the multiplexer controller 25 applies command signals to the first and second multiplexers to couple the output of adder 12b to register 10. A carry signal is generated from register 10 to increment the j pointer by one. If negative, the output signal from negative detector 24 causes the controller 25 to generate command signals so that the output of register 10 is instead reapplied thereto and no carry signal is generated.

Figure 6:
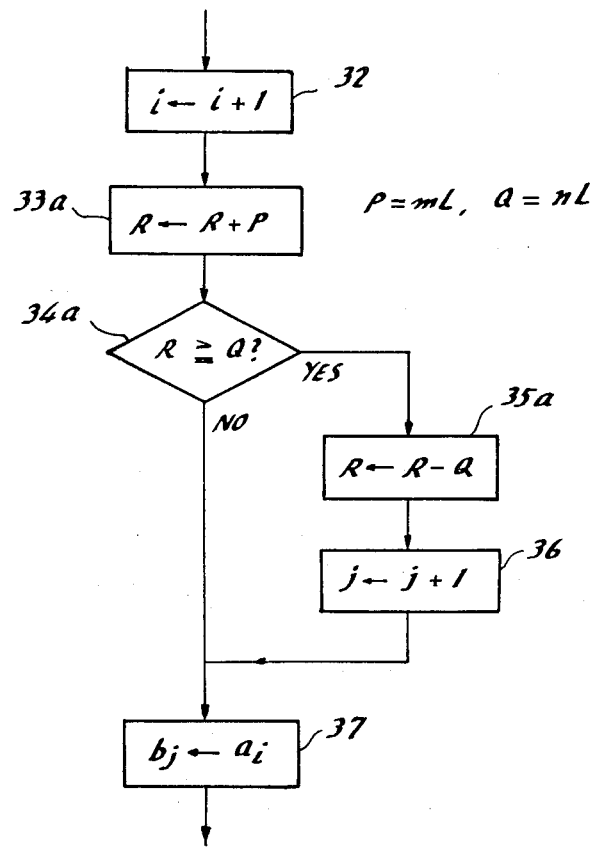
FIG. 6 is an illstration of a flow chart corresponding to the hardware embodiment of FIG. 5.

FIG. 6 is an illustration of a flow diagram which is associated with the FIG. 5 embodiment, wherein blocks corresponding to those in FIG. 4 are marked with the same numerals as used therein. In block 33a, the residue R is summed with the numerator P and in block 34a control checks if R is equal to or greater than the denominator Q. If R≧P, control exits to block 35a to subtract Q from R and advances to Step 36 to increment the j pointer. If R is smaller than Q, the Steps 35a and 36 are skipped to Step 37 to update $b_j$ with $a_i$.

Figure 8:
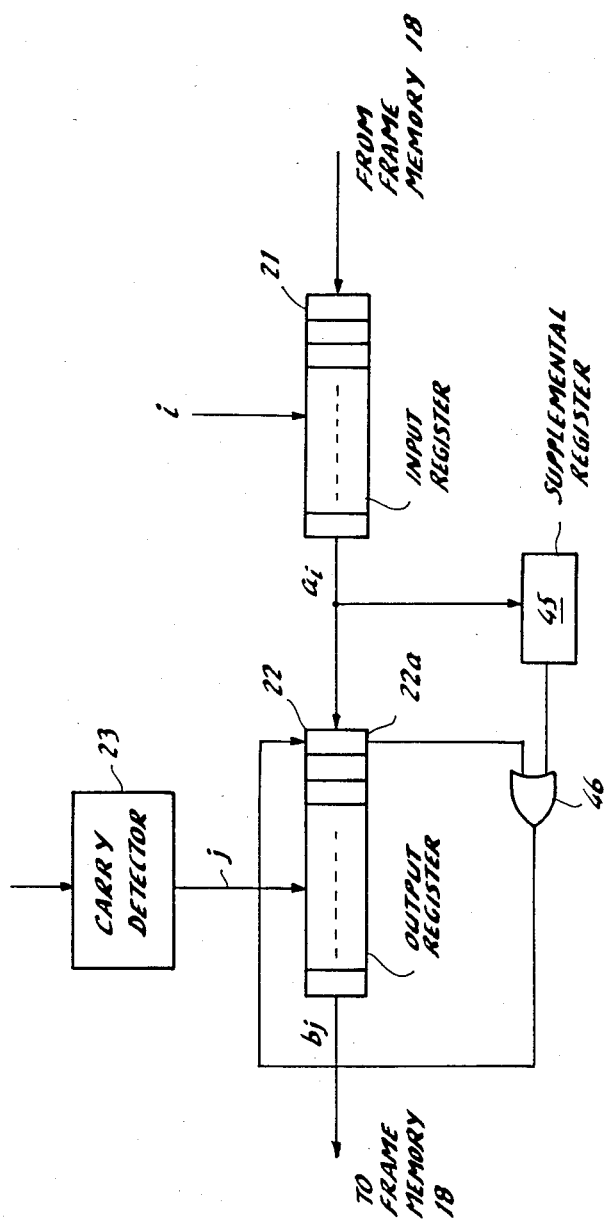
FIG. 8 is an illustration of a hardware block diagram embodying the feature of FIG. 7.

In the previous embodiments, a scale down of a letter T shown at 40 in FIG. 7 is likely to result in a truncation of the stem of the T and a truncation of the arm at opposite ends as shown at 41 if binary 1's at column $a_4$ are lost. The truncation problem can be avoided by modifying the hardware embodiment of FIG. 4 in a manner as shown in FIG. 8 in which a supplemental register 45 is connected to the output of the input register 21 to hold the image signal for one bit duration. An OR gate 46 is provided having a first input connected to the rightmost bit position 22a of the output register 22 and a second input connected to the output of supplemental register 45. The output of OR gate 46 is coupled to the rightmost bit position 22a. With this arrangement, a pair of any successive image data bits $a_i$ and $b_j$ are combined in the OR gate 46 to generate a logical 1 if one of the input bits is a binary 1. The logical 1 from OR gate 46 is loaded into the rightmost bit position of register 22. If $b_j$ is a binary 0 and $a_i$ is a binary 1, the resultant logical 1 from OR gate 46 is loaded into the bit position 22a to alter the binary state of $b_j$ to 1. If $a_{(i+1)}$ is binary 0 at the next trigger instant, the binary 1 of $b_j$ remains unchanged. Therefore, when the rightmost bit position 22a is filled with data $a_1$ it is renewed with data $a_2$ and a binary 1 at 43 is reconstructed at 43' on the column $b_1$ of the scaled down image 42. Likewise, when the rightmost position 22a is filled with data $a_3$, it is renewed as $b_3$ with a binary 1 of data $a_4$, reconstructing binary 1's on the stem of the letter T the $b_3$ column. Data $a_6$ and $a_7$ are likewise combined to reconstruct binary 1's at column $b_5$.

Figure 9:
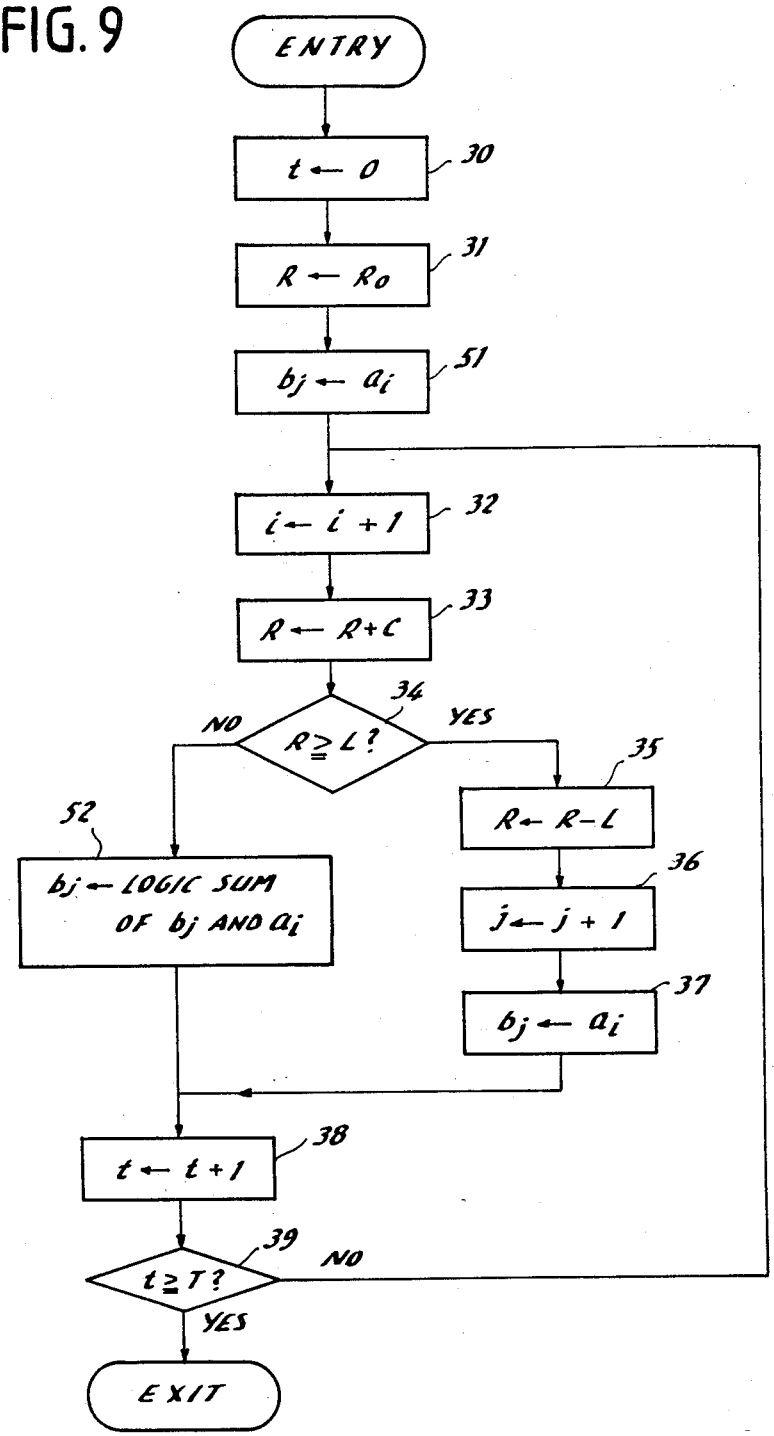
FIG. 9 is an illustration of a software version of FIG. 8.

FIG. 9 is an illustration of a flow diagram associated with the FIG. 8 embodiment. This flow diagram is generally similar to FIG. 4 but differs in that it additionally includes a block 51 to store input data $a_i$ into a memory as output data $b_j$ before the i pointer is incremented in block 32 and further includes a block 52 which is performed if the residue R is smaller than L by resetting $b_j$ to the result of logic summation of $b_j$ and $a_i$. The block 37, by which $b_j$ is reset to $a_i$, is exclusively performed after the j pointer is incremented in block 36.

Figure 10:
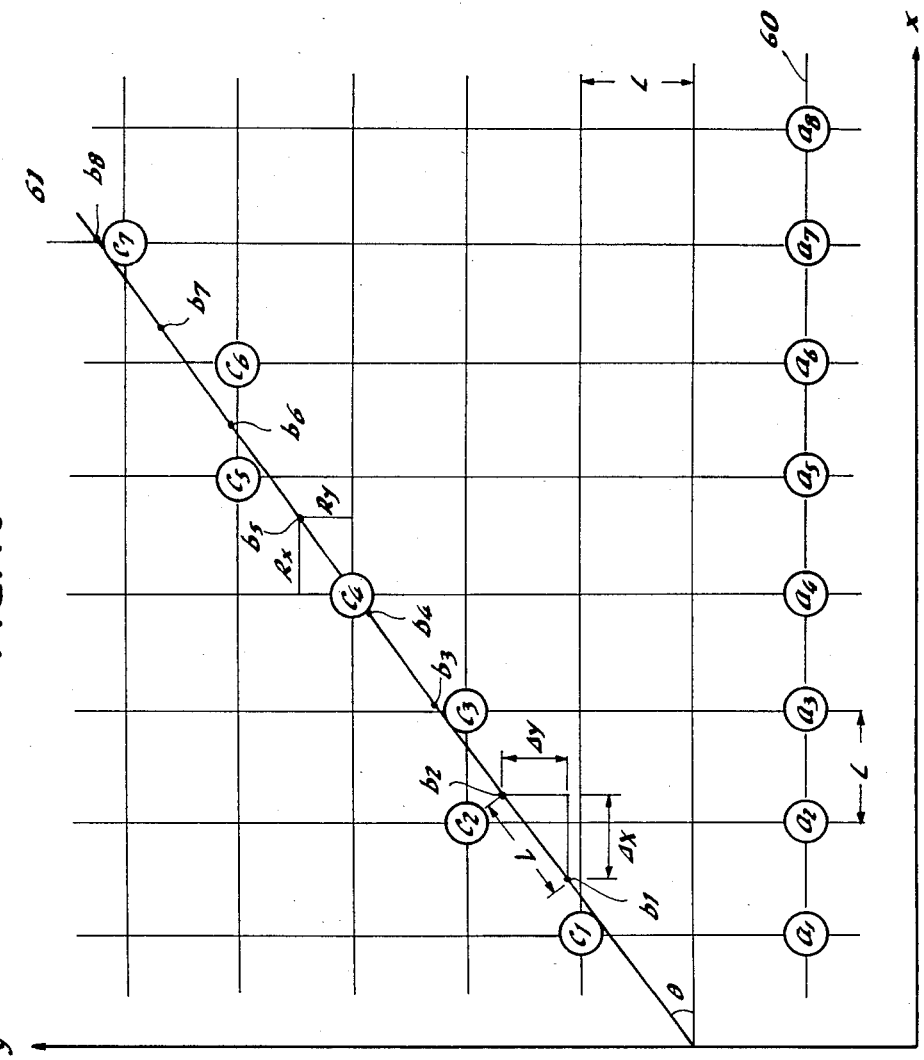
FIG. 10 is an illustration of the principle of rotation by which the orignal image field is rotated to a desired location.

FIG. 10 illustrates the principle of another embodiment of the invention which provides rotation of an original image. For the sake of brevity, the original image comprises binary image data $a_1$ to $a_8$ which are spaced apart a distance L along a straight line 60 as in the previous embodiments which is rotated by an angle $\theta$ so that they are relocated to hypothetical points $b_1$ to $b_8$ along a line 61. The hypothetical locations of image data $b_i$ are further relocated to nearby lattice intersections designated $c_1$ $c_7$ as follows.

The locations of data $b_i$ along the line 61 are represented by coordinates $j = X_{bi}$ and $k = Y_{bi}$.

$$j = X_{bi} = Rxo + (i - 1) \Delta x \quad (5)$$
$$= Rxo + (i - 1)L \cos \theta$$
$$k = Y_{bi} = Ryo + (i - 1) \Delta y \quad (6)$$
$$= Ryo + (i - 1)L \sin \theta$$

where, Rxo and Ryo represent the location of $b_1$ on X-Y coordinates. Data $b_i$ is converted to data $c_{jk}$ by analogy between Equation 1 and Equations 5 and 6 with the scaling ratio m/n corresponding to cos $\theta$ and sin $\theta$.

Figure 11:
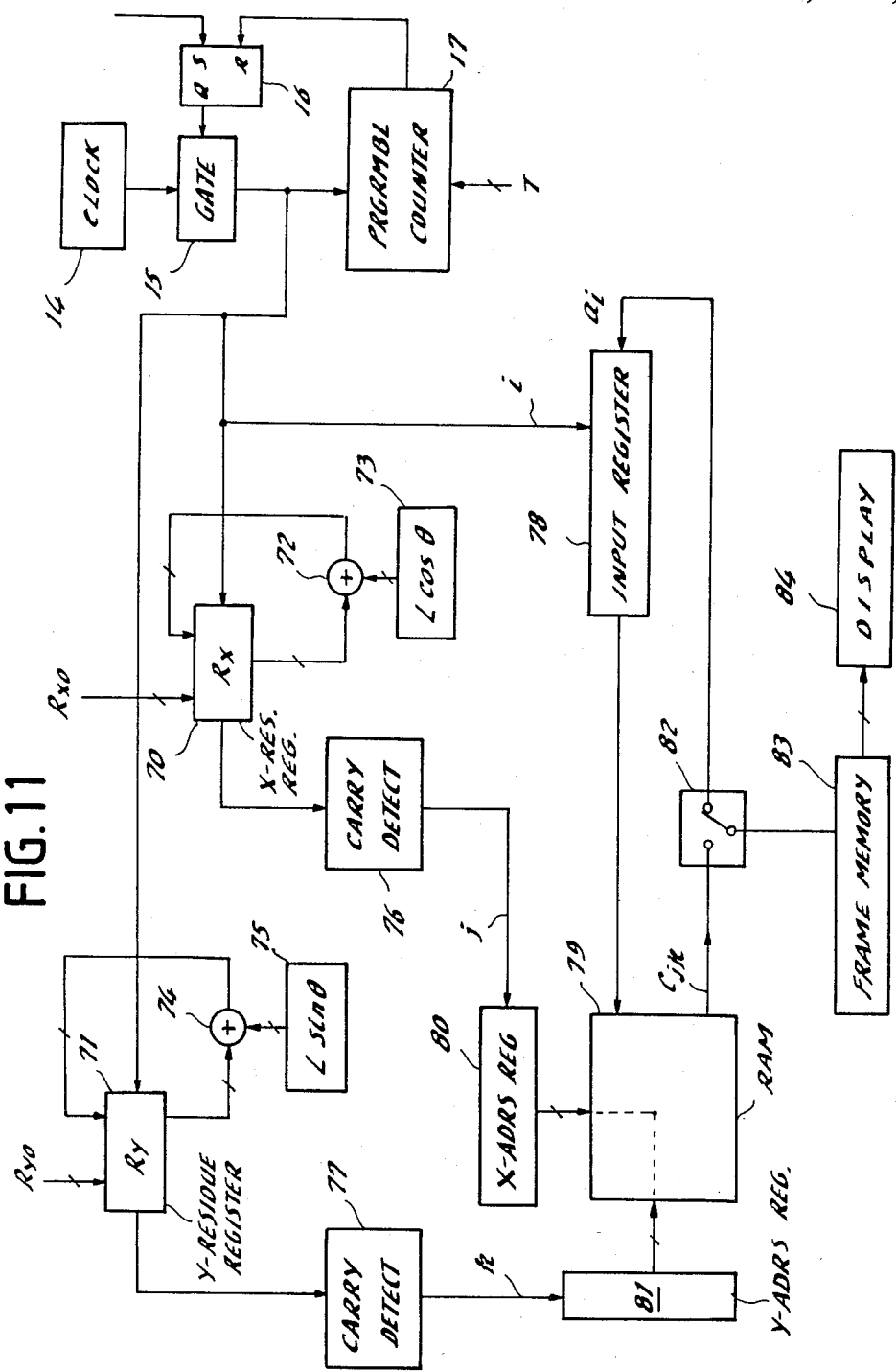
FIG. 11 is an illustration of a hardware embodying the principle of FIG. 10.

FIG. 11 is a schematic illustration of a hardware of a microprocessor embodying the principle shown in FIG. 10. The embodiment generally comprises an X-residue register 70 and a Y-residue register 71 which are resettable to initial residual values Rxo and Ryo, respectively. The X-residue register 70 has L bit positions whose contents are summed in an adder 72 with a binary signal representing L cos $\theta$ from a cosine register 73 and its binary input coupled to the output of adder 72. Likewise, the Y-residue register 71 has L bit positions whose contents are summed in an adder 74 with a binary signal representing L sin $\theta$ from a sine register 75 and its binary input coupled to the output of adder 74. Registers 71 and 72 are triggered by pulses from a pulse generator similar to that shown in FIG. 3 and feed carry signals to carry detectors 76 and 77, respectively.

Original image data is loaded into an input register 78 in response to the i pointer which is supplied from the clock source 14 and shifted to a random-access memory 79 having a matrix array of storage locations which are addressable as a function of the output of an X-address register 80 and a Y-address register 81 which are respectively arranged to receive the j and k pointers from carry detectors 76 and 77. The address code stored in X-address register 79 indicates the location of image data $b_i$ projected on the X-axis of the coordinate system of FIG. 10, while the address code in Y-address register 81 indicates the location of image data $b_j$ projected on the Y-axis. The image data supplied from the input register 78 is stored into a storage location addressed as a function of the X and Y address codes as an image datum $C_{jk}$ and read out of the memory 79 to the frame memory 83 by way of a switch 82 and thence to a display 84.

Figure 12:
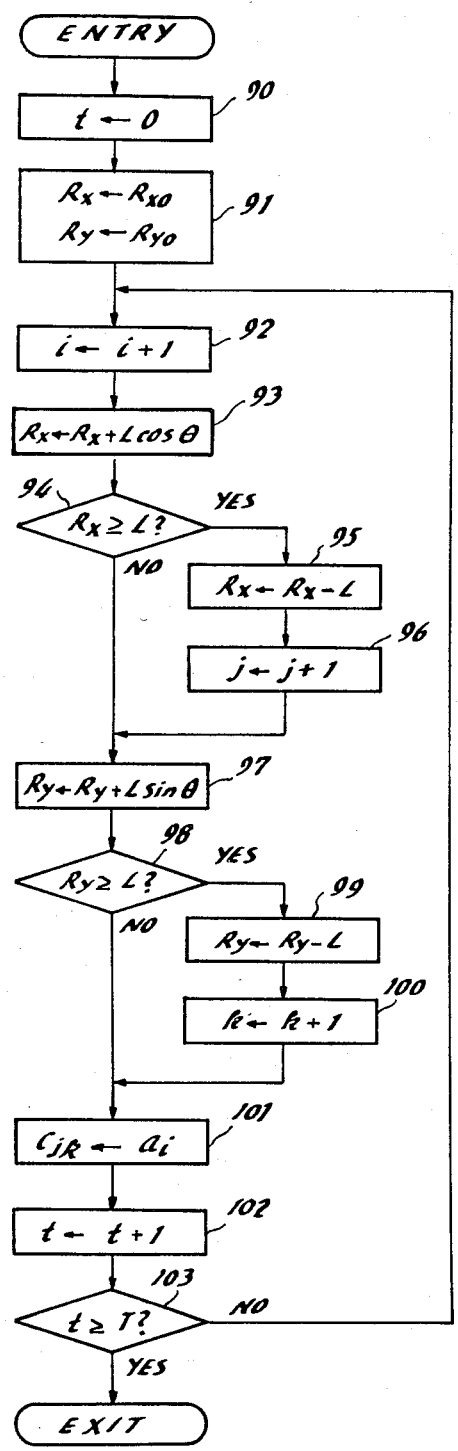
FIG. 12 is an illustration of a software version of FIG. 11.

The operation of the FIG. 11 embodiment will be better understood with reference to a flow diagram shown at FIG. 12. After initializing steps in blocks 90 and 91 by which t is set to zero and residues Rx and Ry are set to Rxo and Ryo respectively, the i pointer is incremented by one (block 92) and $L \cos \theta$ is summed with Rx (block 93) in the adder 72. Rx is compared with L and if Rx is equal to or greater than L, control exits to block 95 to subtract L from Rx. Register 70 is overflowed and carry detector 76 increments the j pointer by one (block 96), and control proceeds to a block 97. If Rx is smaller than L, register 70 is not overflowed and control goes to block 97.

In block 97, $L \sin \theta$ is added to Ry and comparison is made between Ry and L (block 98). If Ry is equal to or greater than L, register 71 is overflowed, subtracting L from Ry (block 99) and the k pointer is incremented by one by carry detector 77 (block 100) and control advances to block 101. If Ry is smaller than L, control exits from block 98 to block 101.

In response to the j and k pointers, $c_{jk}$ data bits are stored into RAM 79 (block 101). Timer t is incremented by one (block 102) and the above process is repeated until t becomes equal to or greater than the total number of bits in the original image area represented by T.

While conventional general purpose data processors can be employed to implement the software of the present invention for high speed computation of binary image processing, it is preferable to modify the hardware of such processors to further increase their operating speed.

Figure 13:
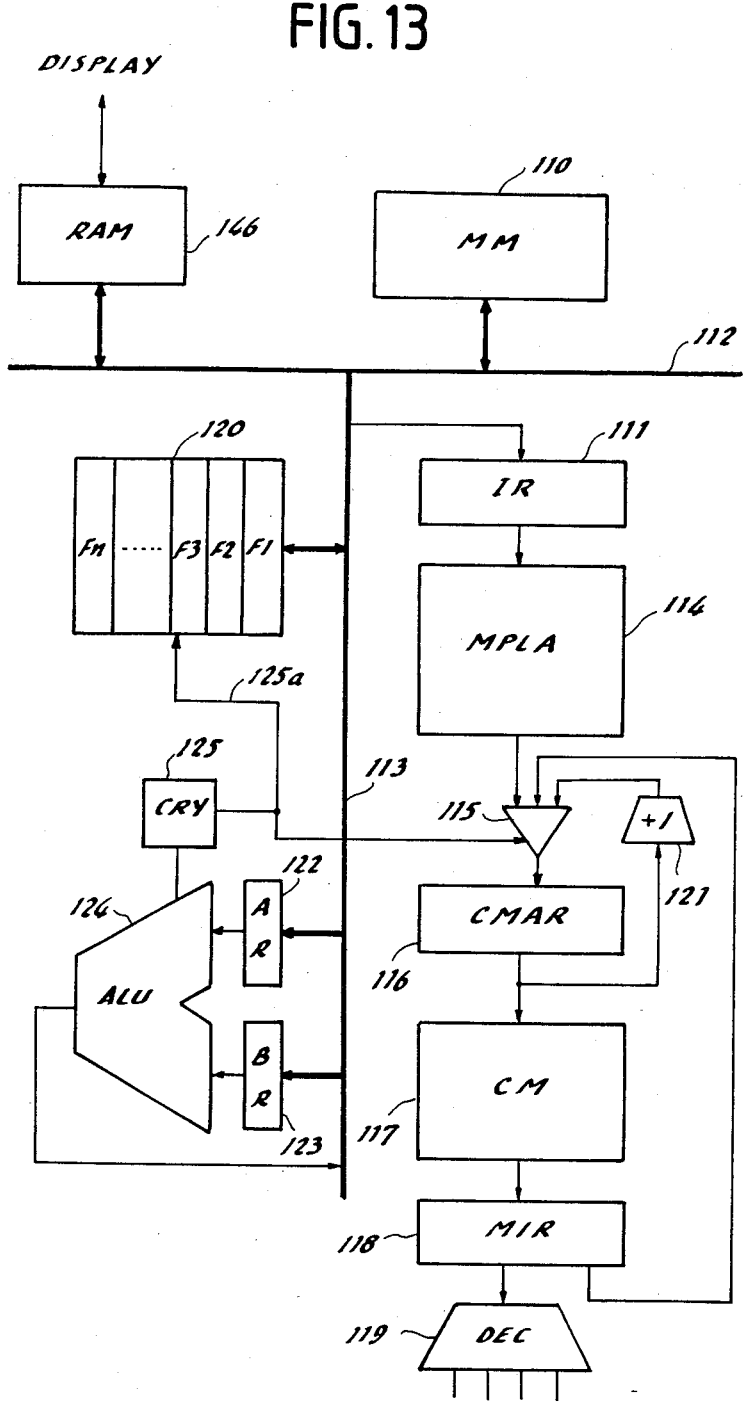
FIGS. 13-16 are illustrations of a microprocessor embodying a high speed processing feature of the present invention.

In FIG. 13, a portion of the hardware of a conventional microprocessor is schematically illustrated. Machine language instructions are transferred from a main memory 110 to an instruction register 111 over memory bus 112 and internal bus 113. A mapping programmable logic array (MPLA) 114 translates the machine language instructions loaded into the instruction register 111 and transmits the header address of the translated microprogram to a multiplexer 115. A control memory address register (CMAR) 116 temporarily stores address information transmitted from MPLA 114 via multiplexer 115. The address information is utilized by a control memory (CM) to read microinstructions for application to a microinstruction register (MIR) 118. A microinstruction decoder (DEC) 119 decodes the microinstructions stored in MIR 118 to generate command signals TR, GE, TW, CSUB which are applied to a register file 120. An incrementor 121 increments the output of CMAR 116 by one and recirculates the incremented output to CMAR 116 via multiplexer 115 to sequantially address microinstructions stored in control memory 117. Shown at 122 and 123 are A-register and B-register respectively which temporarily store information to be fed to arithmetic/logic unit 124. A carry register 125 stores a carry bit overflowed from the most significant bit position of ALU 124, the carry information being transmitted to the multiplexer 115 and to the register file 120.

Figure 15:
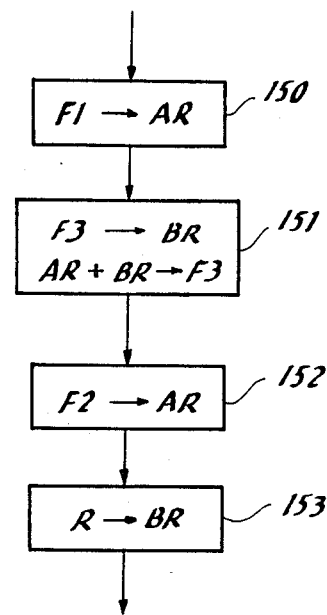

FIG. 15 illustrates a flow diagram by which the contents of the register file 120 are updated. Parameters C ($=Lm/n$), L, R are loaded into word registers F1, F2 and F3 respectively from a frame memory, or random access memory 146. Parameter C on register F1 is first transferred to A-register 122. Parameter R on register F3 is then transferred to B-register and the contents of A- and B-registers are summed and the result of the summation (R+C) is replaced to register F3 (block 151). Parameter L on register F2 is transferred to A-register (block 152). Parameter (C+R) is transferred to B-register (block 153). The conditional subtract operation as effected in the steps 34 and 35, FIG. 4, is performed by the hardware given below to reduce the processing time.

When conditional subtract instructions are loaded into microinstruction register (MIR) 118, ALU 124 performs a subtrat operation on input data L and (R+C) now stored in A- and B-registers respectively. Due to the provision of a connection 125a from the carry register 125 to register file 120 by which carry bit is transmitted thereto, the result of the subtraction is transferred instantly to the register file in response to the occurrence of the carry bit to permit control to advance to block 36, FIG. 4.

Figure 14:
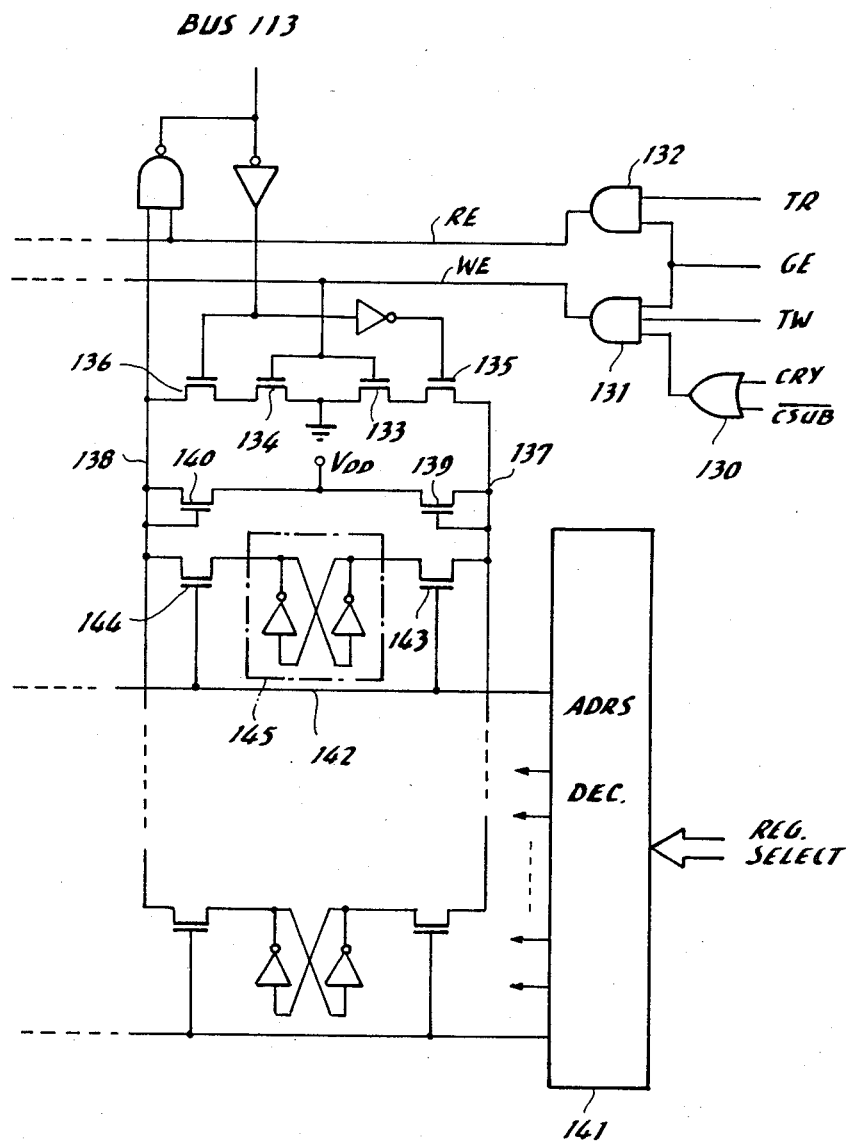

In FIG. 14 wherein details of the register file 120 are shown, a carry bit CRY is applied from carry register 125 to an OR gate 130 to which is also applied a conditional subtraction command signal CSUB which is supplied from the decoder 119. The output of OR gate 130 is applied to an AND gate 131. Register write and read timing signals TW and TR are supplied from the decoder 119 to AND gates 131 and 132 whose outputs respectively represent write enable (WE) and read enable (RE) signals. Signal GE indicating that the data stored in the register file 120 is an operand is also applied from the decoder 119 to AND gates 131 and 132.

In response to a write enable (WE), transistors 133 and 134 are turned on to cause transistor 135 or 136 to turn on depending on the data bits on bus 113, so that line 137 or 138, which have been held at a logical 1 level by transistors 139 and 140, switches to logical 0 level.

A register select signal is applied to an address decoder 141. Assume that a line 142 is brought to a logical 1 level in response to that select signal, transistors 143 and 144 are turned on to store the binary information on the bus 113 into a memory cell 145.

Figure 16:
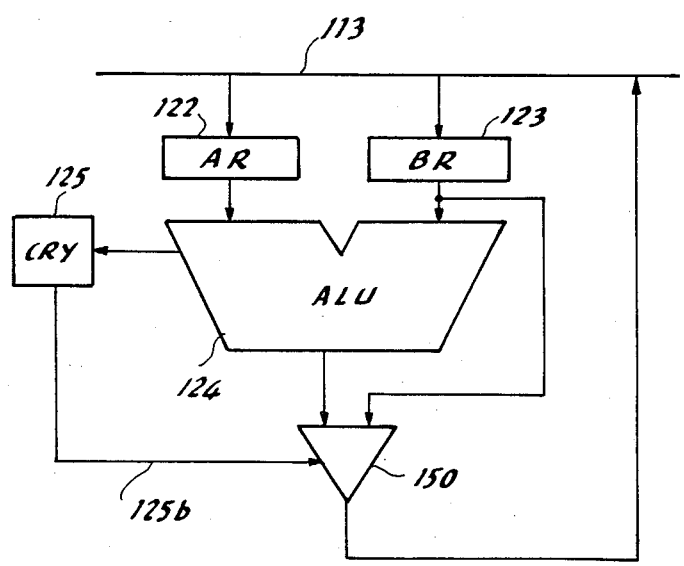

Instead of the connection 125a a multiplexer 150 may be provided as shown in FIG. 16 so that it multiplexes the outputs of ALU and B-register in response to the output of carry register 125 coupled by a connection 125b and delivers the multiplexed data to the bus 113.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method for processing image data by transposition between successively arranged first data points in a first image field and successively arranged second data points in a second image field, comprising the steps of:

(a) successively specifying a said first data point;

(b) summing first control data representing a residual value with second control data representing a constant value;

(c) ($c_1$) if the result of the summation does not exceed a predetermined value, updating said first control data with the result of the summation and specifying a said second data point corresponding to the specified first data point, and ($c_2$) if said result exceeds said predetermined value, subtracting same from the summation result to update said first control data with the residual value of the subtraction, and specifying a said second data point which is shifted by one data point with respect to the specified first data point;

(d) transferring said image data from the specified first data point to the specified second data point when said first image field is greater in dimension than said second image field, or transferring said image data from the specified second data point to the specified first data point when said first image field is smaller in dimension than said second image field; and (e) repeating the steps (a) to (d) until all the second data points are filled with the image data.

2. A method for processing image data by transposition from successively arranged source data points in a first image field to successively arranged destination data points in a second image field, comprising the steps of:

(a) ($a_1$) successively specifying a said source data point when said first image field is greater in dimension than said second image field or ($a_2$) successively specifying a said destination data point when the dimension of said first image field is smaller than the dimension of said second image field;

(b) summing first control data representing a residual value with second control data representing a constant value;

(c) ($c_1$) if the result of the summation does not exceed a predetermined value, updating said first control data with the result of the summation and specifying a said destination data point corresponding to the source data point specified in the substep ($a_1$) when said first image field is greater in dimension than said second image field or specifying a said source data point corresponding to the destination data point specified in the substep ($a_2$) when said first image field is smaller in dimension than said second image field, and ($c_2$) if said result exceeds said predetermined value, subtracting same from the summation result to update said first, control data with the residual value of the subtraction, and specifying a said destination data point which is shifted by one data point with respect to the source data point specified in the substep ($a_1$) when said first image field is greater in dimension than said second image field or specifying a said source data point which is shifted by one data point with respect to the destination data point specified in the substep ($a_2$) when said first image field is smaller in dimension than said second image field;

(d) transferring a successive one of said image data from the specified source data point to the specified destination data point; and (e) repeating the steps (a) to (d) until all the destination data points are filled with the image data.

3. A method as claimed in claim 2, wherein said source data points are equally spaced apart a known distance and said destination data points are equally spaced apart said known distance, and in that said constant value represents a product of said known distance multiplied by the scaling ratio of a dimension of said second image field to a dimension of said first image field, and said predetermined value represents said known distance.

4. A method as claimed in claim 2, wherein said source data points are equally spaced apart a known distance and said destination data points are equally spaced apart said known distance, and in that said constant value represents a product of said known distance multiplied by a dimension of said second image field, and said predetermined value represents a product of said known distance multiplied by a dimension of said first image field.

5. A method as claimed in claim 2, wherein the step (c) further comprises providing a logical summation of a portion of the image data located in one of said destination data points and a successive portion of the image data location in one of said source data points to transfer the result of the logical summation to the specified destination data point if the result of the summation of the step (b) does not exceed said predetermined value.

6. A method as claimed in claim 2, further comprising the step of setting said first control data to a desired initial value.

7. A method for processing image data by transposition from successively arranged source data points equally spaced apart a known distance in a first image field to a set of successively arranged first and second destination data points represented by a coordinate system in a second image field, comprising the steps of:

(a) successively specifying a said source data point;

(b) summing first control data representing a first residual value with second control data representing a product of said known distance multiplied by the cosine of an angle through which said first image field is to be rotated to said second image field;

(c) ($c_1$) if the result of the summation does not exceed a value representing said distance, updating said first control data with the result of the summation and specifying a said first destination data point corresponding to the specified source data point, and ($c_2$) if said result exceeds said predetermined value, subtracting same from the summation result to update said first control data with the residual value of the subtraction, and specifying a said first destination data point which is shifted by one data point with respect to the specified source data point;

(d) summing third control data representing a second residual value with fourth control data representing a product of said known distance multiplied by the sine of said angle;

(e) ($e_1$) if the result of the summation of the step (d) does not exceed said distance representing value, updating said third control data with the result of the summation of the step (d) and specifying a said second destination data point corresponding to the specified source data point, and ($e_2$) if said result exceeds said distance representing value, subtracting same from the last-mentioned summation result to update said third control data with the residual value of the subtraction and specifying a said second destination data point which is shifted by one data point with respect to the specified source data point;

(f) transferring said image data from the specified source data point to the specified first and second destination data points; and (g) repeating the steps (a) to (f) until all the first and second destination data points are filled with the image data.

8. A method as claimed in claim 7, further comprising the step of setting said first and third control data to desired initial values.

9. Apparatus for processing image data by transposition between successively arranged first data points in a first image field and successively arranged second data points in a second image field, comprising:

first means for generating a clock pulse;

second means responsive to said clock pulse for summing first control data indicative of a residual value with second control data indicative of a constant value and if the sum exceeds a predetermined value subtracting the predetermined value from said sum and renewing said first control data with the residual value of the subtraction;

third means having storage locations defining said first data points for storing therein said image data and shifting the stored image data therealong in response to said clock pulse in a first direction when said first image field is greater in dimension that said second image field and in a second direction when said first image field is smaller in dimension that said second image field; and fourth means having storage positions defining said second data points connected to said third means for storing and shifting the image data therealong in response to said sum exceeding said predetermined value in said first direction from said third means to said fourth means when said first image field is greater in dimension than said second image field and in said second direction from said fourth means to said third means when said first image field is smaller in dimension than said second image field.

10. Apparatus as claimed in claim 9, wherein said constant value represents a product of a distance between successive ones of said data points multiplied by a scaling ratio by which said first image field is scaled to a different dimension, and said predetermined value represents said distance.

11. Apparatus as claimed in claim 9, wherein said second means comprises:

a register (10) having storage positions corresponding in number to said predetermined value;

means (11) for setting an initial value (Ro) into said register (10) as said first control data; and adder means (12) for summing the first control data stored in said register (10) and said second control data (C; P) and feeding third control data (R+C; R+P) representing the result of the summation to said register (10);

said register (10) being triggered in response to said clock pulse to combine said first control data with said third control data to generate a carry when the sum of the first and third control data exceeds said predetermined value for causing said fourth means to shift the image data stored therein.

12. Apparatus as claimed in claim 11, wherein said adder (12a) is arranged to provide summation of said first control data with control data representing a product of said distance multiplied by a dimension of said first image field, further comprising:

second adder means (12b) for providing a summation of said first control data from said register (10) with control data representing a negative product of said distance multiplied by said different dimension to generate output control data (R-Q); and means (24-27) for applying said output control data (R-Q) to said register (10) to be combined with said first control data when said sixth control data indicate a positive value and reapplying said first control data (R) thereto from said register (10) when said output control data indicate a negative value.

13. Apparatus as claimed in claim 9, further comprising OR gate means (46) for providing a logical summation of a portion of the image data located in a storage position of the fourth means (22) and a successive portion of the image data located in a storage position of said third means (21) and feeding the output of the OR gate means to said storage position of said fourth means (22).

14. Apparatus as claimed in claim 9, wherein each of said third and fourth means comprises a shift register (21, 22).

15. Apparatus as claimed in claim 9, further comprising means (11) for setting said first control data to a desired initial value.

16. Apparatus as claimed in claim 9, wherein said apparatus forms part of a microprocessor comprising a register file (120) in which parameters indicating said constant and predetermined values are stored, an arithmetic logic unit (124), A-register (122) and B-register (123) which are connected to inputs of said arithmetic logic unit (124) from a bus (113) to which bus is connected a main memory (110), a carry detector (125) coupled to the arithmetic logic unit (124), and microinstruction decoding means (111–119, 121) connected to said bus (113) and responsive to the output of said carry detector (125) for generating a plurality of control signals for application to said register file (120), wherein the output of said carry detector (125) is coupled to said register file (120).

17. Apparatus as claimed in claim 9, wherein said apparatus forms part of a microprocessor comprising a register file (120) in which parameters indicating said constant and predetermined values are stored, an arithmetic logic unit (124), A-register (122) and B-register (123) which are connected to inputs of said arithmetic logic unit (124) from a bus (113) to which bus is connected a main memory (110), a carry detector (125) coupled to the arithmetic logic unit (124), and microinstruction decoding means (111–119, 121) connected to said bus (113) and responsive to the output of said carry detector (125) for generating a plurality of control signals for application to said register file (120), wherein the output of said carry detector (125) is coupled to a multiplexer (150) to which the output of said arithmetic control unit (124) and the output of said B-register (123) is applied.

18. Apparatus for processing image data by transposition from successively arranged source data points equally spaced apart a known distance in a first image field and a set of successively arranged first and second destination data points represented by a coordinate system in a second image field, comprising:

first means for generating a clock pulse;

second means responsive to said clock pulse for summing first control data indicative of a first residual value with second control data indicative of a product of said distance multiplied by the cosine of an angle through which said first image field is to be rotated to said second image field to provide a first sum and subtracting said distance representing value from said first sum if same exceeds a value representing said distance to renew said first control data with the residual value of the subtraction;

third means responsive to said clock pulse for summing third control data indicative of a second residual value with fourth control data indicative of the sine of said angle to provide a second sum and subtracting said distance representing value from the second sum if same exceeds said distance representing value to renew said third control data with the residual value of the subtraction;

fourth means having storage locations defining said source data points for storing therein said image data and shifting the stored image data therealong in response to said clock pulse; and fifth means having a matrix array of storage positions defining said first and second destination data points, the fifth means being connected to said fourth means for shifting the image data in said storage positions in the row direction of the matrix in response to said first sum exceeding said distance representing value and in the column direction in response to said second sum exceeding said distance representing value.

* * * * *